US012665257B2

(12) United States Patent
Kim et al.

(10) Patent No.: US 12,665,257 B2
(45) Date of Patent: Jun. 23, 2026

(54) BATTERY MODULE INCLUDING PRESSURE DROP SHEET

(71) Applicant: SK On Co., Ltd., Seoul (KR)

(72) Inventors: Tae Il Kim, Daejeon (KR); Seo Roh Rhee, Daejeon (KR); Ju Young Jeong, Daejeon (KR)

(73) Assignee: SK On Co., Ltd., Seoul (KR)

( * ) Notice: Subject to any disclaimer, the term of this patent is extended or adjusted under 35 U.S.C. 154(b) by 0 days.

(21) Appl. No.: 18/732,624

(22) Filed: Jun. 4, 2024

(65) Prior Publication Data

US 2024/0322363 A1     Sep. 26, 2024

Related U.S. Application Data

(63) Continuation of application No. 18/095,427, filed on Jan. 10, 2023, now Pat. No. 12,034,178.

(30) Foreign Application Priority Data

Jan. 14, 2022     (KR) ........................ 10-2022-0006090

(51) Int. Cl.
*H01M 50/30*     (2021.01)
*H01M 50/211*    (2021.01)
*H01M 50/375*    (2021.01)

(52) U.S. Cl.
CPC ....... *H01M 50/394* (2021.01); *H01M 50/211* (2021.01); *H01M 50/375* (2021.01)

(58) Field of Classification Search
CPC . H01M 50/394; H01M 50/211; H01M 50/375
See application file for complete search history.

(56) References Cited

U.S. PATENT DOCUMENTS

2012/0231307 A1*  9/2012  Ha ...................... H01M 50/528
                                                       429/82
2016/0254578 A1*  9/2016  Liu ..................... H01M 50/289
                                                       429/120
2017/0062791 A1*  3/2017  Yoo ..................... H01M 50/593
2023/0023362 A1*  1/2023  Wilson .................. D04H 3/002
2023/0026926 A1*  1/2023  Sun .................... H01M 50/249
2023/0352780 A1* 11/2023  Lim .................... H01M 50/557
2024/0088469 A1*  3/2024  Kim .................. H01M 10/6561

* cited by examiner

*Primary Examiner* — Olatunji A Godo
(74) *Attorney, Agent, or Firm* — IP & T GROUP LLP

(57)     ABSTRACT
The present disclosure relates to a battery module including: a battery cell stack in which a plurality of battery cells are stacked; and a pressure drop sheet on one side of the battery cell stack, in which the pressure drop sheet includes: a ventilation layer including ceramic fiber; and a sacrificial layer on at least one surface of the ventilation layer, the sacrificial layer is disposed in a direction facing the battery cell stack, and the pressure drop sheet exhibits gas permeability at a critical temperature.

7 Claims, 5 Drawing Sheets

40    20    30 10

100

40 10 40 20 40 10

100

BATTERY MODULE INCLUDING PRESSURE DROP SHEET

CROSS-REFERENCE TO RELATED APPLICATIONS

This application is a continuation of U.S. patent application Ser. No. 18/095,427 filed on Jan. 10, 2023, which claims priority under 35 U.S.C. § 119 to Korean Patent Application No. 10-2022-0006090, filed on Jan. 14, 2022, in the Korean Intellectual Property Office, the disclosure of which is incorporated herein by reference in its entirety.

TECHNICAL FIELD

The following disclosure relates to a battery module including a pressure drop sheet.

BACKGROUND

Secondary batteries that are easy to apply according to product groups and have electrical characteristics such as high energy density are universally applied not only to portable devices, but also to an electric vehicle (EV) or a hybrid vehicle (HEV) driven by an electric driving source. These secondary batteries are attracting attention as a new energy source to improve eco-friendliness and energy efficiency because they not only have the primary advantage of dramatically reducing the use of fossil fuels, but also do not generate any by-products from the use of energy.

The types of secondary batteries currently widely used may include a lithium ion battery, a lithium polymer battery, a nickel cadmium battery, a nickel hydride battery, a nickel zinc battery, and the like. An operating voltage of the unit secondary battery cell, that is, the unit battery cell, is about 2.5V to 4.5V. Therefore, when a higher output voltage is required, a battery pack may be configured by connecting a plurality of battery cells in series, and may be configured by connecting a plurality of battery cells in parallel according to the charge/discharge capacity required for the battery pack. The number of battery cells included in the battery pack may be variously set according to the required output voltage or charge/discharge capacity.

In the case of constituting the battery pack by connecting the plurality of battery cells in series/parallel, a method of constituting a battery pack or a battery rack by first configuring a battery module including at least one battery cell and adding other components using the at least one battery module is generally used.

Meanwhile, since the secondary battery has a risk of explosion when overheated, securing safety is one of the important tasks. The abnormal heat generation of the secondary battery is generated due to several causes. One of these causes may be a case in which an over-current of a limit or more flows through the lithium secondary battery. When an overcurrent flows, the internal temperature rises rapidly due to the heat generation of the secondary battery, and a thermal runaway phenomenon occurs, which leads to the explosion of the secondary battery. Even the non-ideal heat generation phenomenon occurring due to a short circuit inside the cell, overcharging, physical external shock, etc., may lead to explosion or ignition of the secondary battery and increase the risk of a fire accident, and therefore, needs to be strictly managed.

In particular, when a plurality of secondary cells are included in a battery module or battery pack, the problem of stability becomes more serious. The high-temperature gas generated by the abnormal heat generation of any one battery cell inside the module may not escape out of the module, thereby increasing the pressure inside the module, and the thermal runaway of the battery cell leads to the explosion of the entire battery module, etc., thereby causing great damage.

Therefore, there is a need for a method capable of quickly discharging the high-temperature gas due to the abnormal heat generation of at least one battery cell inside the module to the outside of the module and minimizing damage caused by an additional chain reaction.

SUMMARY

An embodiment of the present invention is directed to providing a battery module capable of preventing a thermal runaway phenomenon from propagating by quickly discharging high-temperature gas generated inside the battery module to the outside of the battery module when the thermal runaway phenomenon occurs inside the battery module.

Another embodiment of the present invention is directed to providing a battery module capable of preventing a module case from being damaged by a flame generated inside the battery module when a thermal runaway phenomenon occurs inside the battery module.

In one general aspect, a battery module includes: a battery cell stack in which a plurality of battery cells are stacked; and a pressure drop sheet on one side of the battery cell stack, in which the pressure drop sheet includes: a ventilation layer including ceramic fiber; and a sacrificial layer on at least one surface of the ventilation layer, the sacrificial layer is disposed in a direction facing the battery cell stack, and the pressure drop sheet exhibits gas permeability at a critical temperature.

The battery cell may include electrode lead tabs at both end portions of the battery cell.

The battery module may further include: a module housing accommodating the battery cell stack, in which the module housing may include: a lower housing accommodating the battery cell stack; and an upper plate disposed above the battery cell stack and coupled to the lower housing, and the pressure drop sheet may be between the module housing and the battery cell stack, and the module housing may include a plurality of venting holes in a portion corresponding to the pressure drop sheet.

The pressure drop sheet may have a ratio of air permeability A before reaching the critical temperature and air permeability B after reaching the critical temperature that satisfies Equation 1 below.

$$B/A > 2 \qquad \text{[Equation 1]}$$

The sacrificial layer may be lost at the critical temperature.

The sacrificial layer may be non-permeable to gas at the critical temperature or lower.

The critical temperature may be 150 to 250° C.

The sacrificial layer may have a shrinkage deformation rate of 40 to 80% at the critical temperature.

The sacrificial layer may have a weight reduction rate of 40 to 80% when thermogravimetric analysis (TGA) at the critical temperature.

The ceramic fiber may include at least one or two or more selected from alumina fiber, silica fiber, alumina-silica fiber, zirconia fiber, alumina-zirconia-silica fiber, and zirconia-silica fiber.

The ventilation layer may maintain a breathable structure at the critical temperature.

A porosity of the ventilation layer may have a porosity of 40 to 90% and an average pore size of 1 to 500 μm.

The pressure drop sheet may further include an interface layer between the ventilation layer and the sacrificial layer.

The pressure drop sheet may further include an adhesive layer between the ventilation layer and the sacrificial layer.

The adhesive layer may include at least one adhesive selected from an acrylic resin, a silicone resin, rubber, and an epoxy resin.

The pressure drop sheet may further include: the ventilation layer; a sacrificial layer formed on one surface of the ventilation layer; and an adhesive layer formed on the other surface of the ventilation layer.

The pressure drop sheet may include: the ventilation layer; and a sacrificial layer formed on both surfaces of the ventilation layer, and further include an adhesive layer formed on the sacrificial layer facing the module housing.

DETAILED DESCRIPTION OF MAIN ELEMENTS

Figure 1:
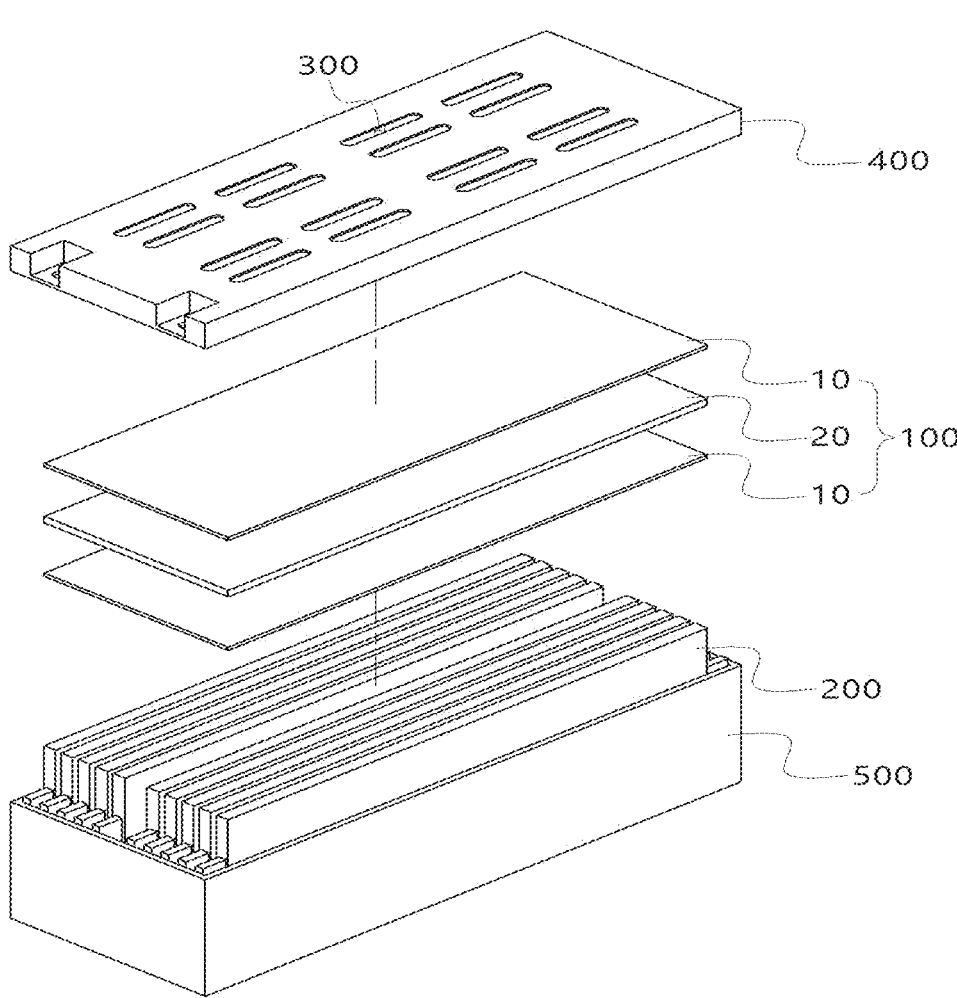
FIG. 1 is a module perspective view illustrating a battery module according to an embodiment of the present disclosure.

10: Sacrificial layer
20: ventilation layer
30: Interface layer
40: Adhesive layer
100: Pressure drop sheet
200: Battery cell stack
300: Venting hole
400: Upper plate
500: Lower housing

DETAILED DESCRIPTION OF EMBODIMENTS

Expressions such as lower, upper, front, rear, front, rear, both sides or side described in the present specification are expressed based on when viewed in direction A illustrated in FIG. 1, and are expressed differently when the direction of the target is changed.

A singular form of a term used herein may be construed to include a plural form as well unless otherwise indicated.

Numerical ranges as used herein include all possible combinations of lower and upper limits and all values within that range, all values defined herein, and upper and lower limits of numerical ranges defined in different forms. Unless otherwise defined in the specification of the present specification, values out of a numerical range that may occur due to experimental errors or rounding of values are also included in the defined numerical range.

"Including" mentioned herein is an open-ended description having an equivalent meaning to expressions such as "comprising", "containing", "having", "characterizing", and elements, materials, or processes not listed additionally are not excluded.

A unit of thermal conductivity mentioned in the present specification means W/mK unit measured at 180° C.

A critical temperature mentioned herein means a temperature at which a rapid shape deformation of sacrificial layer occurs, and may mean, for example, a temperature at which a melting point or shrinkage deformation occurs.

Hereinafter, exemplary embodiments of the present disclosure will be described with reference to the accompanying drawings. However, exemplary embodiments in the present disclosure may be modified in several other forms, and the scope of the present disclosure is not limited to exemplary embodiments to be described below. Rather, these embodiments of the present disclosure are provided so that the present disclosure will completely describe the present disclosure to those skilled in the art. In the drawings, shapes, sizes, and the like, of components may be exaggerated for clarity.

When a high-temperature situation occurs due to abnormal heat generation of any one battery cell included in the battery module, a high-temperature gas or flame may be generated inside the battery module. As a result, there is a problem in that an internal pressure of the module rises, leading to a thermal runaway phenomenon of the battery cell that causes explosion of the entire battery module or the like, and causing great damage.

Therefore, there is a need for a method capable of quickly discharging the high-temperature gas due to the abnormal heat generation of at least one battery cell inside the module to the outside of the module and minimizing damage caused by an additional chain reaction.

Accordingly, the present disclosure relates to a battery module including: a battery cell stack 200 in which a plurality of battery cells are stacked; and a pressure drop sheet 100 located on one side of the battery cell stack 200, in which the pressure drop sheet 100 includes: a ventilation layer 20 including ceramic fiber; and a sacrificial layer 10 formed on at least one surface of the ventilation layer 20, the sacrificial layer 10 is disposed in a direction facing the battery cell stack 200, and the pressure drop sheet 100 exhibits gas permeability at a critical temperature.

The battery cell may include a pouch type secondary battery, a prismatic secondary battery, or a cylindrical secondary battery, and may also include a secondary battery commonly used in the related art. The battery cell may be provided in plurality, and the plurality of battery cells may be stacked in a form electrically connected to each other. The present disclosure uses the pouch type secondary battery as an embodiment. The pouch type secondary battery includes an electrode assembly and an electrolyte, and the electrode assembly includes a plurality of electrode plates and electrode tabs and is accommodated in a pouch. Here, the electrode plate may include a cathode plate and an anode plate, and the electrode assembly may be configured in a stacked form with a separator interposed between the cathode plate and the anode plate while wide surfaces of the cathode plate and the anode plate face each other.

FIG. 1 illustrates a battery module according to an embodiment of the present disclosure. Referring to FIG. 1, the battery cell stack 200 may be configured in a form in which a plurality of pouch type secondary batteries are stacked. The battery cell stack 200 may be configured by stacking and arranging a plurality of battery cells in a left-right direction or a horizontal direction while the battery cells are vertically erected in an internal space of a module housing, which will be described later. The stacking method is not necessarily limited thereto, and if necessary, the battery cell stack 200 may be configured by stacking battery cells in a vertical direction while lying horizontally.

In an embodiment, the battery cell may include electrode lead tabs on both end portions. In the electrode assembly, electrode tabs may be provided on each of the plurality of cathode plates and anode plates and connected to the same electrode lead tab by contacting the same polarities, and a portion of the electrode lead tab may be exposed to the outside of the pouch. The electrode lead tabs may be formed in opposite directions to each other with respect to the battery cell, and may include a cathode lead tab and an anode lead tab. For example, the cathode lead tab may be provided at one end portion of the battery cell based on a center of the battery cell. The anode lead tab may be provided on the other end portion.

In an embodiment, the battery module may further include a module housing accommodating the battery cell stack 200. The module housing may include: a lower housing 500 accommodating the battery cell stack 200; and an upper plate 400 disposed above the battery cell stack 200 and coupled to the lower housing 500, in which the pressure drop sheet 100 is located between the module housing and the battery cell stack 200, and the module housing has a plurality of venting holes 300 in a portion corresponding to the pressure drop sheet 100.

Referring to FIG. 1, the module housing may be configured to include a lower housing 500 supporting the lower, front, rear, and both sides of the battery cell stack 200 and an upper plate 400 disposed above the battery cell stack and coupled to the lower housing 500. Specifically, the lower housing 500 may be a form in which a lower plate supporting a lower portion of the battery cell stack, a cover plate supporting front and rear surfaces of the battery cell stack, and side plates supporting both sides of the battery cell stack may be bonded to each other. In order to firmly support the battery cell stack, the lower housing 500 may be configured to directly contact the battery cell stack, but if necessary, various modifications such as interposing a heat dissipation pad, a buffer pad, or the like between the lower housing 500 and the battery cell stack may be possible. The upper plate 400 may be disposed above the battery cell stack and coupled to the lower housing 500. The lower housing 500 and the upper plate 400 may be coupled by performing welding, for example, laser welding or the like on a contact surface thereof. In addition, the lower housing 500 and the upper plate 400 may be coupled by a sliding or bonding method, by using a fixing method such as a bolt or a screw, or the like. The lower housing 500 and/or the upper plate 400 may be made of a material having high thermal conductivity such as metal. For example, the lower housing 500 and/or the upper plate 400 may be made of an aluminum material, and various materials may be used as long as they have similar strength and thermal conductivity.

Figures 3, 4, 5, 6:
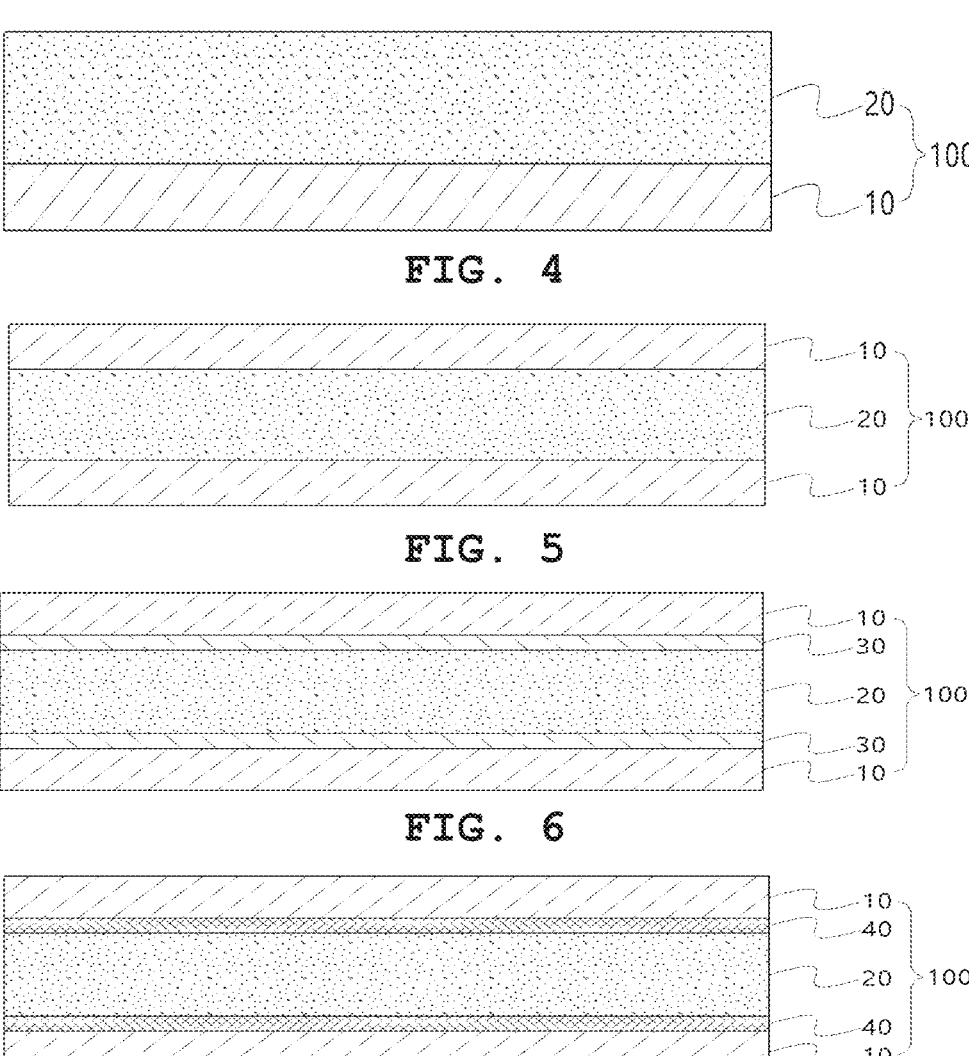
FIG. 3 is a cross-sectional view of a pressure drop sheet according to an embodiment of the present disclosure.
FIG. 4 is a cross-sectional view of a pressure drop sheet according to an embodiment of the present disclosure.
FIG. 5 is a cross-sectional view of a pressure drop sheet according to an embodiment of the present disclosure.
FIG. 6 is a cross-sectional view of a pressure drop sheet according to an embodiment of the present disclosure.

FIG. 3 is a cross-sectional view of the pressure drop sheet 100 according to an example of the present disclosure, and FIG. 4 is a cross-sectional view of the pressure drop sheet 100 according to another example of the present disclosure.

The pressure drop sheet 100 may include a ventilation layer 20 including ceramic fiber; and a sacrificial layer 10 formed on at least one surface of the ventilation layer 20. The pressure drop sheet 100 of FIG. 3 illustrates an example of having a double layer structure in which the sacrificial layer 10 is stacked on one side of the ventilation layer 20, and the pressure drop sheet 100 of FIG. 4 illustrates an example of having a three-layer structure in which the sacrificial layers 10 are stacked on both surfaces of the ventilation layer 20.

Referring to FIG. 1, the pressure drop sheet 100 may be positioned between the module housing and the battery cell stack 200, and the sacrificial layer 10 of the pressure drop sheet 100 may be disposed in a directing in which the sacrificial layer 10 faces the battery cell stack 200. When a fire occurs due to abnormal heat generation in any one battery cell inside the module, the sacrificial layer 10 facing the battery cell stack 200 is directly exposed to high-temperature heat or flame. The sacrificial layer 10 is a layer that is lost at a critical temperature. The loss may mean that the sacrificial layer 10 melts or burns and the shape of the sacrificial layer 10 is lost, or may be a comprehensive meaning including shrinkage or deformation to a degree that may cause a rapid increase in air permeability.

When the sacrificial layer 10 is lost by high-temperature heat or flame, the ventilation layer 20 is exposed. The ventilation layer 20 is a layer containing ceramic fiber, and has pores through which gas may pass, thus having excellent gas permeability. The high-temperature gas generated inside the module is quickly discharged through the pores of the ventilation layer 20, and the pressure inside the module may be effectively lowered. Accordingly, it is possible to effectively block problems that may lead to the explosion of the module due to an increase in internal pressure of the module due to the high-temperature gas. That is, the pressure drop sheet 100 having the structure of the sacrificial layer 10/ventilation layer 20 exhibits gas permeability at a critical temperature and quickly discharges the high-temperature gas through the ventilation layer 20, thereby preventing the explosion from occurring due to the increase in internal pressure. In addition, since the sacrificial layer 10 is disposed to face the battery cell stack 200, it is possible to prevent the occurrence of the thermal deformation and the clogging of pores due to the direct exposure of the ventilation layer 20 to the high-temperature heat or flame.

The pressure drop sheet 100 may have a thin thickness. In the case of suppressing the propagation of high-temperature heat or flame with only one conventional insulation layer, the thickness of the pressure drop sheet 100 should be extremely thick. On the other hand, the pressure drop sheet 100 has the multi-layer structure of the sacrificial layer 10/ventilation layer 20 and may satisfy both the internal pressure drop and insulation performance of the module by changing components of each layer, it is possible to reduce the thickness of the entire sheet. Accordingly, it is possible to improve the energy density of the battery module while ensuring the safety of the battery module. The thickness of the pressure drop sheet 100 may have a thickness of 0.5 to 10 mm, specifically 0.5 to 8 mm, and more specifically 1 to 6 mm.

Figure 2:
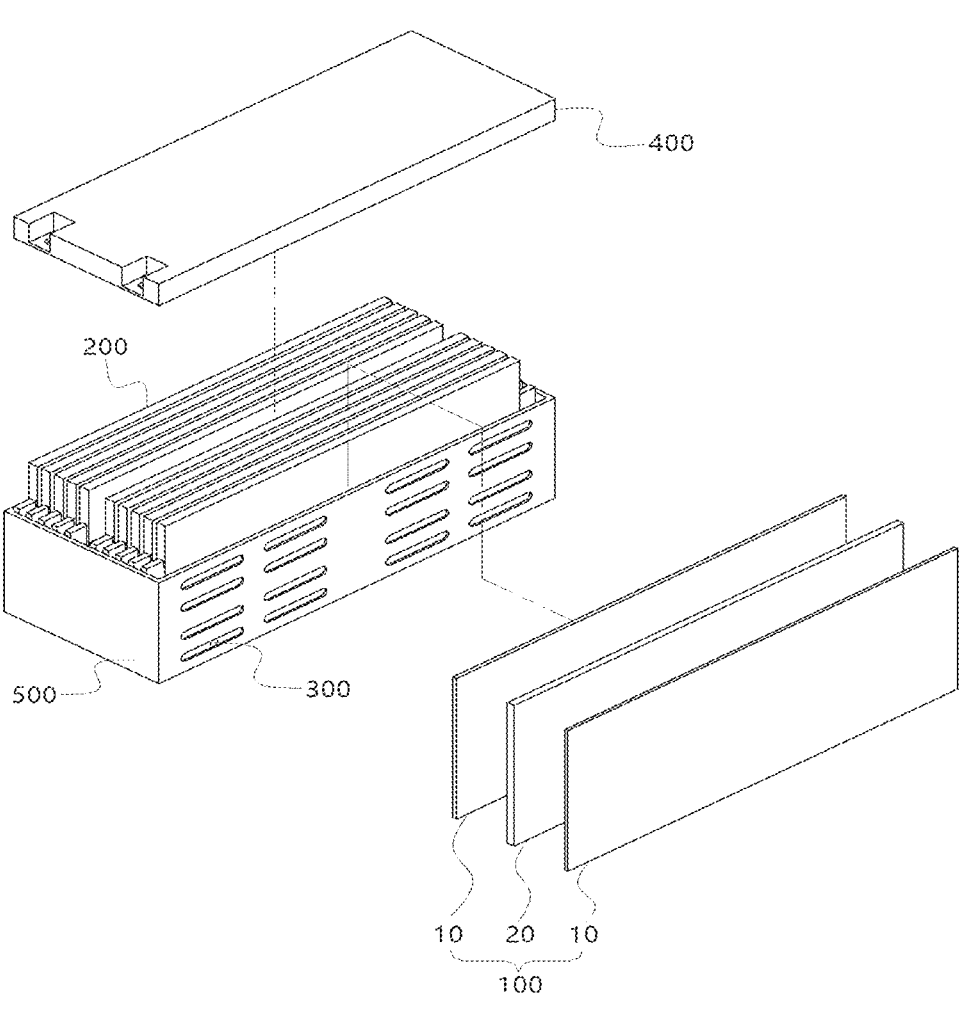
FIG. 2 is a module perspective view illustrating a battery module according to another embodiment of the present disclosure.

The pressure drop sheet 100 may be located on at least one surface of the battery cell stack 200 where the electrode lead tab is not located. Referring to FIG. 1, when the battery cell stack 200 is stacked in the left-right direction, the pressure drop sheet 100 may be located above the battery cell stack 200 where the electrode lead tab is not located. Referring to FIG. 2 which is another embodiment, the pressure drop sheet 100 may be located on the right side of the battery cell stack 200 where the electrode lead tab is not located. The pressure drop sheet 100 may be located on any one surface according to the number or shape of the battery cells included in the battery module, or may be located in plural numbers on two or more surfaces.

The module housing may include a plurality of venting holes 300 at a portion corresponding to the pressure drop sheet 100. The venting hole 300 is for adjusting the pressure in the battery module, and when the high-temperature gas is generated due to the thermal runaway phenomenon, the gas inside the module may be discharged to the outside of the module through the venting hole 300. As described above, the sacrificial layer 10 located in the direction facing the battery cell stack 200 in the pressure drop sheet 100 may be lost at a critical temperature, and the high-temperature gas passing through the ventilation layer 20 may be quickly discharged to the outside of the module through the venting hole 300. In the normal operating environment other than the fire or abnormal heat situation, the sacrificial layer 10 of the pressure drop sheet 100 exists and the ventilation layer 20 is not exposed. The occurrence of the short circuit and thermal runaway phenomenon in the battery module due to the inflow of foreign matters into the module may be prevented and the corrosion due to the inflow of moisture may be prevented, so the module may be stably operated.

Referring to FIG. 1 which is an embodiment, the pressure drop sheet 100 is located above the battery cell stack, and the venting hole 300 is formed in the upper plate 400 of the module housing. Referring to FIG. 2 which is another embodiment, referring to FIG. 2, the pressure drop sheet 100 is located on the right side of the battery cell stack, and the venting hole 300 is formed in the plate on the right side of the module housing. The venting hole 300 may be formed at any position of the module housing as long as it corresponds to the pressure drop sheet 100 without any limitation. The venting hole 300 is provided in plurality and may be disposed spaced apart from each other. The plurality of venting holes 300 are not particularly limited in the separation interval, size, or shape, and may exist in various forms.

In an embodiment, the pressure drop sheet 100 may have a ratio of air permeability A before reaching the critical temperature and air permeability B after reaching the critical temperature that satisfies Equation 1 below.

$$B/A > 2 \qquad \text{[Equation 1]}$$

Before reaching the critical temperature, the sacrificial layer 10 is not lost, so the gas permeability of the pressure drop sheet (100 is low. After reaching the critical temperature, the sacrificial layer 10 is lost and the ventilation layer 20 is exposed to improve the gas permeability. When B/A, the ratio of the air permeability A and the air permeability B, is less than 2, the high-temperature gas may not be effectively discharged, and thus, the pressure inside the module may not drop, but rather the pressure inside the module may continuously rise, so there is a problem in that the battery module explodes or the thermal runaway occurs. When B/A satisfies Equation 1 above, the high-temperature gas may be quickly discharged and the pressure inside the module may be effectively lowered. Specifically, the ratio of B/A represented by Equation 1 may be 5 or more, and more specifically 5 or more or 50 or less.

In an embodiment, the air permeability may be measured using a Gurley densometer. Specifically, in accordance with JIS standard P-8117, the air permeability may be derived by measuring the time taken for 100 cc of air to permeate using the Gurley densometer. It is not necessarily limited to the above measurement method, and an air permeability measurement method commonly used in the art may be used. Through this, the air permeability A of the pressure drop sheet before reaching the critical temperature and the air permeability B of the pressure drop sheet after reaching the critical temperature are measured, respectively, and the ratio may be converted to derive the above Equation 1.

The pressure drop sheet 100 will be described in more detail as follows.

<Sacrificial Layer 10>

In an embodiment, the sacrificial layer 10 may be lost or deformed at a critical temperature. As described above, the loss means that an initial shape is deformed or lost due to melting or burning, and is a comprehensive meaning including shrinkage, deformation, or the like.

In an embodiment, the critical temperature may be 150 to 250° C. Since the sacrificial layer 10 has a critical temperature in terms of a material, as described above, the shape of the sacrificial layer 10 is rapidly deformed at the critical temperature or so, so, at the critical temperature or higher, the sacrificial layer 10 may be lost and the ventilation layer 20 may be opened. The normal operating temperature of the battery module is 100° C. or lower, and an initial temperature of gas generated by thermal runaway phenomenon is a high-temperature gas that is usually about 200° C. When the sacrificial layer 10 is not lost at the critical temperature or higher, as the thermal runaway phenomenon continues, the internal pressure of the module continuously rises, so the chain explosion of the battery module or battery pack may occur. Since the sacrificial layer 10 is made of a material that is lost at a critical temperature, it is possible to prevent the battery module from exploding due to the rise of pressure and more safely manage the module. As the material forming the sacrificial layer 10, a material such as flammable paper or synthetic fiber that is lost at about the critical temperature may be used, and may be used in the form of a thin sheet or film. Specifically, the material may be nonwoven paper having relatively low heat r cellulose-based paper, organic paper, inorganic/organic hybrid paper, a polyethylene film, a polypropylene film, a PVC film, and the like.

In an embodiment, the sacrificial layer 10 may be non-permeable to gas at the critical temperature or lower. When heat at the critical temperature or lower is generated, the sacrificial layer 10 is not lost and maintains its shape, and may have non-permeable to gas or low gas permeability. In addition, since the sacrificial layer 10 has a moisture-proof effect against moisture, it is possible to prevent moisture or foreign matter from entering into the module. As a result, it is possible to suppress the occurrence of the short circuit and the thermal runaway phenomenon in the battery module and stably operate the module.

The thermal conductivity of the sacrificial layer 10 may be 0.01 to 0.3 W/mK. In order to effectively suppress the propagation of heat, it may have a low thermal conductivity from the normal operating temperature of the battery to the temperature which is about the critical temperature. Specifically, the thermal conductivity may be 0.05 to 0.2 W/mK.

As described above, the critical temperature is a temperature at which the melting point or shrinkage deformation of the sacrificial layer 10 occurs, and the rapid shape deformation of the sacrificial layer 10 occurs at the critical temperature. As an aspect of the shape deformation of the sacrificial layer 10, the sacrificial layer 10 may shrink and reduce its volume or area, or melt or burn to lose its shape along with the weight reduction.

In an embodiment, the sacrificial layer 10 may have a shrinkage deformation rate of 40 to 80% at the critical temperature. As described above, the sacrificial layer 10 may shrink at a critical temperature to have the reduced volume or area, and as a result, the ventilation layer 20 is exposed as much as the shrinkage deformation portion. When the shrinkage deformation rate satisfies the above range, the sacrificial layer 10 is lost at the critical temperature and the area exposed to the ventilation layer 20 increases, so the structural stability of the pressure drop sheet 100 may also be maintained while the high-temperature gas may be quickly discharged. Specifically, the shrinkage deformation rate may be 50 to 70%.

In an embodiment, the sacrificial layer 10 may have a weight reduction rate of 40 to 80% during thermogravimetric analysis (TGA) at a critical temperature. As described above, the sacrificial layer 10 may melt or burn at a critical temperature and lose its shape along with weight reduction. In this case, the weight reduction rate may be 40 to 80%. When the weight reduction rate satisfies the above range, the degree of loss of the sacrificial layer 10 may increase, so the ventilation layer 20 may also maintain the structural stability of the pressure drop sheet 100 while quickly discharging the high-temperature gas. Specifically, the weight reduction rate may be 50 to 70%.

The sacrificial layer 10 may have a thin thickness. The thicker the sacrificial layer, the higher the insulation effect. However, the sacrificial layer 10 is not lost at the critical temperature, so the pressure inside the module may continuously rise. The thickness may be specifically 0.1 to 1 mm, and more specifically 0.1 to 0.5 mm.

<Ventilation Layer 20>

The ventilation layer 20 may include ceramic fiber. Since the ventilation layer 20 having a porous structure is made of a ceramic fiber material, the high-temperature gas may be quickly discharged to the outside of the module. The ventilation layer 20 has excellent heat resistance, porosity, mechanical properties, and gas permeability. As the ceramic fibers are assembled to form a layer, the layer becomes porous and may form the ventilation layer 20. As the ventilation layer 20 includes the ceramic fiber, the pressure drop sheet 100 may have structural stability in all temperature ranges. This structural stability is due to the fact that the surface of the ventilation layer 20 is composed of a plurality of ceramic fiber aggregates and has high interfacial adhesion properties with the sacrificial layer 10. Compared to the pressure drop sheet 100 including the sacrificial layer 10 and the porous inorganic support having low interfacial adhesion properties, it is possible to structural stability and implement more improved significantly improved gas permeation characteristics. In particular, as the sacrificial layer 10 and the ventilation layer 20 including the ceramic fiber are coupled, the sacrificial layer 10 may provide the structural stability that the sacrificial layer 10 may not provide at the critical temperature or lower, and may have excellent insulation properties and prevent the inflow of pollutants, and may quickly drop the internal pressure of the module through the high gas permeability and prevent the module housing from being damaged due to the flame at the critical temperature or higher.

In an embodiment, the ceramic fiber includes at least one or two or more selected from alumina fiber, silica fiber, alumina-silica fiber, zirconia fiber, alumina-zirconia-silica fiber, and zirconia-silica fiber. Since the material has excellent fire resistance and heat resistance, after the sacrificial layer 10 is lost, the sacrificial layer 10 may maintain its shape when exposed to the high-temperature heat or flame, and therefore, has excellent durability. Specifically, the sacrificial layer 10 may be at least one or two or more fibers selected from alumina fiber, silica fiber, or alumina-silica fiber.

The ceramic fiber may have various forms, and may be in the form of wool or sheet as a non-limiting example.

In an embodiment, the ventilation layer 20 may maintain a breathable structure at the critical temperature or higher. For example, when about 45 to 75 wt % of alumina and about 25 to 55 wt % of silica are included in the alumina-silica ceramic fiber, the melting point may be about 1600° C. or higher. Accordingly, even when the sacrificial layer 10 is lost and the ventilation layer 20 is exposed, the breathable structure may be maintained without being deformed by heat, it is possible to obtain the mechanical properties and structural stability in all temperature ranges, and prevent the module housing from being damaged by the flame.

The density of the ceramic fiber may be 0.5 g/cm$^3$ or less. Since the porosity inside the fiber increases as the density of the ceramic fiber decreases, the gas permeability of the ventilation layer 20 may be improved by using the ceramic fiber having a low density that satisfies the above range. Accordingly, when the thermal runaway phenomenon occurs, the high-temperature gas may be effectively discharged to the outside of the module, and the ratio of the air permeability A before reaching the critical temperature of the pressure drop sheet 100 and the air permeability B after reaching the critical temperature of the pressure drop sheet 100 may satisfy B/A>2. Specifically, the density of the ceramic fiber may be 0.3 g/cm$^3$ or less, and may be 0.05 to 0.3 g/cm$^3$ without limitation.

In an embodiment, the porosity of the ventilation layer 20 may have a porosity of 40 to 90% and an average pore size may be 1 to 500 μm. When the porosity and the average pore size satisfy the above range, the gas permeability may be improved and the high-temperature gas is rapidly discharged to the outside of the module, thereby effectively reducing the internal pressure of the module. When the porosity and average pore size exceed the above range, the gas permeability may increase, but the mechanical properties such as durability may deteriorate, and when the porosity and average pore size are smaller than the above range, the gas permeability may deteriorate. Specifically, the porosity of the ventilation layer 20 may have a porosity of 60 to 85% and the average pore size may be 10 to 100 μm.

The average length of the ceramic fiber may be 1 to 50 mm. Within the above range, the rate of entanglement between the ceramic fibers increases, so the mechanical strength may be improved. The short fiber may be used in consideration of the large area and reproducibility of fiber. Specifically, the average length of the ceramic fiber may be 10 to 40 mm, and more specifically, 20 to 30 mm.

The ventilation layer 20 may have a thin thickness. The thickness of the ventilation layer 20 may be appropriately determined within the range from the minimum thickness that may be included in the pressure drop sheet 100 to the maximum thickness considering process costs or the like without excessively increasing the size of the secondary battery module when disposed in the secondary battery module. Accordingly, it is possible to improve the energy density of the battery module while ensuring the safety of the battery module. The thickness of the ventilation layer 20 may have a thickness of 1 to 10 mm, specifically 1 to 8 mm, and more specifically 1 to 5 mm.

The ventilation layer 20 may include the inorganic particles in addition to the ceramic fiber. Examples of the inorganic particles may include $TiO_2$, $SiO_2$, $BaTiO_3$, PbS, $ZrO_2$, SiC, NaF, and LiF particles. The inorganic particles may be used alone or in combination of two or more types. In this case, it is possible to improve thermal insulation in the high-temperature region.

<Interface Layer 30>

In a first aspect of the pressure drop sheet 100, the pressure drop sheet 100 may further include the interface layer 30 between the ventilation layer 20 and the sacrificial layer 10. When manufacturing the pressure drop sheet 100, a coating and curing process, a pressure press process in a wet state, or a heat contact process may be performed to stack the sacrificial layer 10 on the ventilation layer 20. In this process, the bonding between the ventilation layer 20 and the sacrificial layer 10 occurs. Accordingly, as illustrated in FIG. 5, the interface layer 30 may be uniformly formed between the ventilation layer 20 and the sacrificial layer 10 and the bonding strength may be improved. The interface layer 30 may include both the material included in the sacrificial layer 10 and the ceramic fiber, and as a result, it is possible to suppress the peeling of the pressure drop sheet 100 and improve the durability. In particular, according to the thermal runaway phenomenon occurring inside the battery module, heat may be effectively transferred to the material included in the sacrificial layer 10 coexisting in the interface layer 30 through the ceramic fiber having higher thermal conductivity, and then heat may be transferred to the sacrificial layer 10 to quickly induce the loss of the sacrificial layer 10.

<Adhesive Layer 40>

In a second aspect of the pressure drop sheet 100, the pressure drop sheet 100 may further include the adhesive layer 40 between the ventilation layer 20 and the sacrificial layer 10. This is another aspect of the pressure drop sheet 100, and as illustrated in FIG. 6, a separate adhesive layer 40 may be provided to couple the ventilation layer 20 and the sacrificial layer 10. When a fine gap such as a separation space between the ventilation layer 20 and the sacrificial layer 10 occurs, the bonding strength may decrease due to the inflow of air or the like, so it is possible to improve the bonding adhesion between each layer by a method such as a method of providing and pressurizing the adhesive layer 40. The adhesive layer 40 may have a thickness of 0.2 mm or less and specifically 0.1 mm or less, and may be 0.2 to 0.1 mm without limitation.

In an embodiment, the adhesive layer 40 may include at least one adhesive selected from an acrylic resin, a silicone resin, rubber, and an epoxy resin. The bonding strength between the ventilation layer 20 and the sacrificial layer 10 may be improved by using the adhesive. The adhesive layer 40 may use an inorganic double-sided tape made of only the adhesive layer 40 or a double-sided tape having an adhesive on both sides of a substrate. Specifically, the adhesive layer 40 may include one or more adhesives selected from an acrylic resin and a silicone resin, and both sides of the tape may be made with a single adhesive, or both sides of the tape may each include acrylic resin/silicone resin differently to be used as a component-based double-sided tape. When the adhesive layer includes a substrate, the substrate may be, for example, a film made of PET, polyimide, fluoropolymer, PVC, or the like, or a substrate in the form of foam, nonwoven fabric, filament, fabric, or the like may be used.

Figure 7:
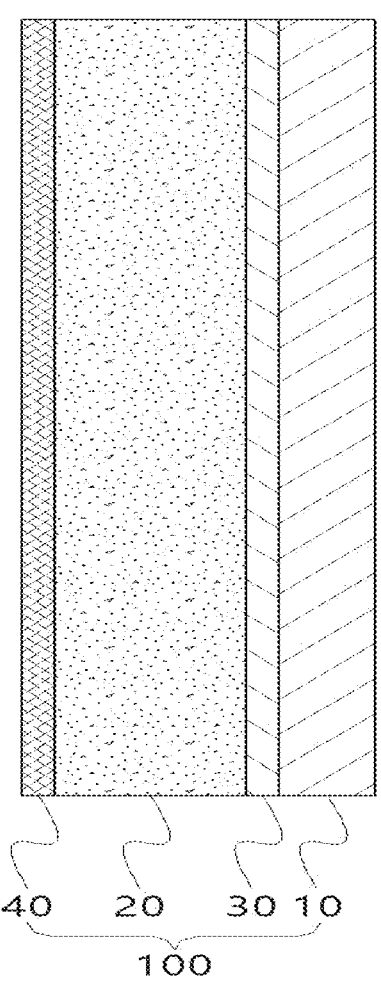
FIG. 7 is a diagram illustrating a facing direction of a pressure drop sheet when a fire occurs inside a module in an embodiment of the present disclosure.
Figure 7:

In an embodiment, the pressure drop sheet 100 may further include the ventilation layer 20, the sacrificial layer 10 formed on one surface of the ventilation layer 20, and the adhesive layer 40 formed on the other surface of the ventilation layer 20. FIG. 7 illustrates that the pressure drop sheet 100 further includes the adhesive layer 40 on the other surface of the ventilation layer 20 in the pressure drop sheet 100 in which the ventilation layer 20, the interface layer 30, and the sacrificial layer 10 are stacked in this order. As described above, the sacrificial layer 10 of the pressure drop sheet 100 may be disposed facing the battery cell stack 200, and the adhesive layer 40 may be formed on the other surface of the ventilation layer 20 to effectively attach the module housing and the pressure drop sheet 100.

Figure 8:
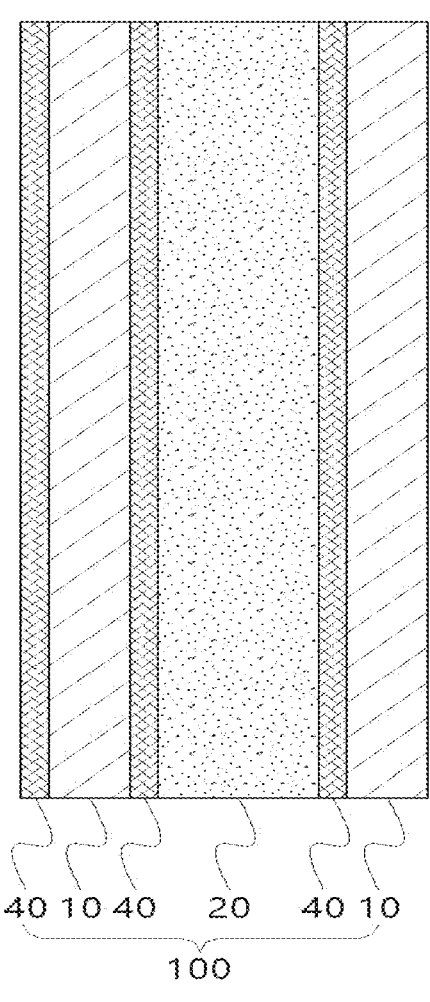
FIG. 8 is a diagram illustrating a facing direction of a pressure drop sheet when a fire occurs inside a module in another embodiment of the present disclosure.
Figure 8:

In an embodiment, the pressure drop sheet 100 may include the ventilation layer 20 and the sacrificial layer 10 formed on both surfaces of the ventilation layer 20, and further include the adhesive layer 40 formed on the sacrificial layer facing the module housing. FIG. 8 illustrates the pressure drop sheet 100 including the adhesive layer 40 formed on the sacrificial layer 10 facing the module housing in the pressure drop sheet 100 in which the adhesive layer 40, the ventilation layer 20, the adhesive layer 40, and the sacrificial layer 10 are stacked in this order. As such, the pressure drop sheet 100 of the present disclosure may be variously designed and changed based on the ventilation layer 20 and the sacrificial layer 10 formed on at least one surface of the ventilation layer 20.

Hereinafter, the present disclosure will be described in detail with reference to Examples, but these are for describing the present invention in more detail, and the scope of the present invention is not limited to the Examples below.

Example 1

In order to evaluate the effect of suppressing thermal runaway propagation of a battery module according to an embodiment of the present disclosure, referring to GB/T-38031 safety test, which is one of the safety tests of a battery module, any one battery cell inside the battery module was heated to 300° C. or higher to intentionally simulate a thermal runaway situation. A venting hole 300 was formed in an upper plate 400 of the battery module including the pouch-type battery cell stack, and the pressure drop sheet 100 of the present disclosure was attached to an inner surface of the upper plate 400. In this case, the pressure drop sheet 100 in which a sacrificial layer 10 of non-woven paper (3M company, FRB-NT076) is stacked on both surfaces of the ventilation layer 20 having a porosity of 70% and an average pore size of 400 μm including an alumina-silica ceramic fiber material was used. The ventilation layer 20 and the sacrificial layer 10 were stacked using an acrylic resin-silicone resin two-component double-sided adhesive.

Comparative Example 1

In Example 1, a battery module having the same configuration as Example 1 was prepared except that the venting hole 300 and the pressure drop sheet 100 were not provided.

Comparative Example 2

In Example 1, a battery module having the same configuration as in Example 1 was prepared except that the pressure drop sheet 100 was composed of only the sacrificial layer 10 without the ventilation layer 20.

Comparative Example 3

In Example 1, a battery module having the same configuration as in Example 1 was prepared except that the pressure drop sheet 100 was composed of only the ventilation layer 20 without the sacrificial layer 10.

Evaluation Example

As a first evaluation item, it was confirmed whether the battery module exploded while the thermal runaway phenomenon was continued for 5 minutes.

As a second evaluation item, after the thermal runaway phenomenon was continued for 30 minutes, the degree of damage to the module housing (Al case) due to the exposure to flame was evaluated. Based on the appearance of the Al case, when any part of the Al case starts to melt, it was evaluated that the Al case was damaged, and the deformation such as expansion or burning was not reflected (O: Melting, X: Not melting).

As a third evaluation item, it was evaluated whether the short circuit in the battery module occurred while the battery module was operated for 5 minutes in a normal operating environment in which no thermal runaway or ignition occurred.

TABLE 1

|  | Example 1 | Comparative Example 1 | Comparative Example 2 |
|---|---|---|---|
| Ventilation Layer | o | x | x |
| Sacrificial Layer | o | x | o |
| Venting hole | o | x | o |
| Explosion or not | x | o | x |
| Degree of Damage to Module Housing (Al Case) | x | o | o |

Referring to Table 1, in the case of Example 1, it was confirmed that the pressure drop sheet 100 was provided, and as a result, even if the thermal runaway phenomenon occurred, the battery module did not explode, and the Al case was significantly less damaged.

On the other hand, in the case of Comparative Example 1, it could be confirmed that the battery module exploded due to the thermal runaway because the internal pressure of the module could not be relieved. In the case of Comparative Example 2, it was confirmed that the battery module did not explode, but the significant portion of the module housing (Al case) was melted and damaged. Accordingly, it could be seen that the existence of the sacrificial layer 10 alone did not satisfy the heat resistance, the durability, and the structural stability provided by the ventilation layer 20.

In addition, although not shown in Table 1, as a result of evaluating whether the short circuit occurred in the module while operating the battery module for 5 minutes in the normal operating environment which is the third evaluation item, in the case of Example 1, no short circuit in the battery module occurred. However, in the case of Comparative Example 3, it was confirmed that a large amount of foreign matters and moisture were introduced into the module, making it unsuitable for stable operation of the battery module. In particular, it was confirmed that the short circuit occurred due to the inflow of foreign matters, resulting in the thermal runaway phenomenon.

According to the battery module of the present disclosure, it is possible to prevent a thermal runaway phenomenon from propagating by quickly discharging high-temperature gas generated inside the battery module to the outside of the battery module when the thermal runaway phenomenon occurs inside the battery module.

According to the battery module of the present disclosure, it is possible to prevent a module case from being damaged by a flame generated inside the battery module when a thermal runaway phenomenon occurs inside the battery module.

According to the battery module of the present disclosure, it is possible to stably operate the battery module without a short circuit or corrosion in a normal operating environment.

Although the embodiments of the present disclosure have been described above, the present disclosure is not limited to the above embodiments, but may be manufactured in a variety of different forms, and those of ordinary skill in the art to which the present disclosure pertains will understand that the present disclosure may be implemented in other specific forms without changing the technical spirit or essential features of the present disclosure. Therefore, it is to be understood that the embodiments described hereinabove are illustrative rather than being restrictive in all aspects.

What is claimed is:

1. A battery module, comprising: a battery cell stack in which a plurality of battery cells are stacked; and a pressure drop sheet formed as a flat rectangular sheet and positioned on one side of the battery cell stack, wherein the pressure drop sheet covers the plurality of battery cells and extends across substantially an entire surface of the battery cell stack on the one side of the battery cell stack, wherein the pressure drop sheet includes a ventilation layer and a sacrificial layer on a surface of the ventilation layer, and directly faces the battery cell stack, wherein, before reaching a critical temperature, the sacrificial layer is maintained and the sacrificial layer is exposed to the battery cell stack, and after reaching the critical temperature, the sacrificial layer is lost and the ventilation layer is exposed to the battery cell stack so that gas generated from the battery cell stack is released across substantially an entire area of the pressure drop sheet, wherein the pressure drop sheet has a ratio of gas permeability A before reaching the critical temperature and gas permeability B after reaching the critical temperature that satisfies Equation 1 below:

$$B/A > 2 \qquad \text{[Equation 1.]}$$

2. The battery module of claim 1,
wherein the ventilation layer is permeable to gas and the sacrificial layer is non-permeable to gas,
wherein the sacrificial layer is lost upon reaching a critical temperature, such that the gas permeability after reaching the critical temperature of the pressure drop sheet is higher than the gas permeability before reaching the critical temperature.

3. The battery module of claim 1,
wherein the ventilation layer includes a ceramic fiber.

4. A battery module, comprising:
a battery cell stack in which a plurality of battery cells are stacked; and
a pressure drop sheet on one side of the battery cell stack,
wherein the pressure drop sheet includes a ventilation layer and a sacrificial layer on a surface of the ventilation layer and directly facing the battery cell stack,
wherein, before reaching a critical temperature, the sacrificial layer is maintained and the sacrificial layer is exposed to the battery cell stack, and after reaching the critical temperature, the sacrificial layer is lost and the ventilation layer is exposed to the battery cell stack, wherein the ventilation layer includes a ceramic fiber, and wherein the ceramic fiber has about 45 to 75 wt % of alumina and about 25 to 55 wt % of silica.

5. The battery module of claim 3, wherein the density of the ceramic fiber is 0.5 g/cm3 or less.

6. The battery module of claim 3, wherein the average length of the ceramic fiber is 1 to 50 mm.

7. The battery module of claim 1, wherein the ventilation layer includes the inorganic particles, wherein the inorganic particles include TiO2, SiO2, BaTiO3, PbS, ZrO2, SiC, NaF, and LiF particles.

\* \* \* \* \*